US012646346B2

(12) United States Patent
Maiman et al.

(10) Patent No.: US 12,646,346 B2
(45) Date of Patent: Jun. 2, 2026

(54) SYSTEMS AND METHODS FOR GENERATING SYNTHETIC TRAINING DATASETS FOR TRAINING MACHINE LEARNING MODELS IN TRAINING DATA-SPARSE ENVIRONMENTS FOR NON-HOMOGENOUS PREDICTIONS

(71) Applicant: Capital One Services, LLC, McLean, VA (US)

(72) Inventors: Tyler Maiman, Melville, NY (US); Kevin Osborn, Newton Highlands, MA (US); Shabnam Kousha, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 734 days.

(21) Appl. No.: 18/055,632

(22) Filed: Nov. 15, 2022

(65) Prior Publication Data

US 2024/0161525 A1     May 16, 2024

(51) Int. Cl.
*G06V 30/19* (2022.01)
*G06F 16/951* (2019.01)
*G06F 40/40* (2020.01)

(52) U.S. Cl.
CPC ...... *G06V 30/19147* (2022.01); *G06F 16/951* (2019.01); *G06F 40/40* (2020.01)

(58) Field of Classification Search
CPC ................................ G06V 30/40; G06F 40/44
See application file for complete search history.

(56) References Cited

U.S. PATENT DOCUMENTS

| | | | | |
|---|---|---|---|---|
| 2008/0071749 | A1* | 3/2008 | Schloter | G06F 16/58 |
| 2012/0323674 | A1* | 12/2012 | Simmons | G06Q 30/0241 |
| | | | | 705/14.41 |
| 2016/0343056 | A1* | 11/2016 | Hu | G06Q 30/0631 |
| 2020/0342242 | A1* | 10/2020 | Avidan | G06N 3/045 |
| 2023/0274096 | A1* | 8/2023 | Bohra | G06F 40/30 |
| | | | | 704/2 |

* cited by examiner

*Primary Examiner* — Akwasi M Sarpong
*Assistant Examiner* — Michael L Burleson
(74) *Attorney, Agent, or Firm* — Foley & Lardner LLP

(57) ABSTRACT

In some embodiments, generating synthetic training datasets for training machine learning models in training data-sparse environments for non-homogenous predictions may be facilitated. In some embodiments, user-specific information associated with a user may be received. The system may generate synthetic training data representing one or more alternative actions corresponding to one or more characteristics by: labeling the user-specific information, determining (e.g., based on the labeled user-specific information) one or more characteristics of the labeled user-specific information, and determining (e.g., based on the one or more characteristics) one or more alternative actions corresponding to the one or more characteristics. The system may then train a machine learning model based on the synthetic training data to generate a prediction in response to providing an action of a first user to the machine learning model.

20 Claims, 5 Drawing Sheets

200

Display component(s) 202

Input component(s) 204

Communication component(s) 208

Processor(s) 206

Sensor(s) 210

Storage(s) 212

Application(s) 214

Application 214a

Application 214b

...

Application 214N

<u>400</u>

SYSTEMS AND METHODS FOR GENERATING SYNTHETIC TRAINING DATASETS FOR TRAINING MACHINE LEARNING MODELS IN TRAINING DATA-SPARSE ENVIRONMENTS FOR NON-HOMOGENOUS PREDICTIONS

BACKGROUND

Existing machine learning model training methods often use a large amount of rich training data that may be keyed to a specific element. For example, in attempting to train a machine learning model to generate a prediction that is related to what time a user may wake up on a given Monday morning, existing methods may train the machine learning model on training data consisting of what time a user has previously woken up on Monday mornings over the past three years. While existing machine learning model training methods present benefits such as accurately generating predictions that are keyed to a particular element or output, such machine learning model training relies on a large amount of rich and robust training data. When training data is sparse (e.g., a small amount of training data, training data that is not keyed to a particular element, insufficient training data, etc.), difficulties may be encountered in training a machine learning model, let alone in training such machine learning model to generate more complex predictions when the little training data available is not directly associated with the predictions that the machine learning model is intended to output.

SUMMARY

Methods and systems are described herein for novel uses and/or improvements to training machine learning models in training data-sparse environments. In particular, methods and systems are disclosed herein for generating synthetic training datasets for training machine learning models in training data-sparse environments for non-homogeneous predictions. As one example, methods and systems are described herein for training a machine learning model to generate predictions associated with one type of data when the training data available is of another type of data.

As discussed above, existing systems and/or methods for training machine learning models often rely on a large training dataset that consists of the same type of data as the intended output of the machine learning model. For example, to train a machine learning model to generate a prediction related to what time a user may wake up on a Monday morning, existing systems may train a machine learning model on timestamps that indicate when a user has woken up on Monday mornings over the past three years. However, not only is this training dataset large (e.g., data compiled over three years), but the intended output of the machine learning model is directly associated with the training data (e.g., training data consists of times at which a user has woken up on Mondays, and the output prediction is what time a user may wake up on a future Monday morning). When available training data is sparse (e.g., a few data points of what time the user has previously woken up, no data points of what time the user has previously woken up) or when the available training data is not of the same type of data as the intended output (e.g., the training data consists of what time the user has previously woken up on Saturday mornings, the training data consists of how many books the user has read, etc.), training the machine learning model to generate a prediction related to what time the user will wake up on a Monday morning in the future may prove difficult, if not impossible.

To overcome these technical deficiencies, methods and systems disclosed herein may generate synthetic training datasets for training machine learning models in such training data-sparse environments for non-homogeneous predictions. For example, the methods and systems disclosed herein may generate synthetic training datasets by determining one or more characteristics of available training data, and based on the one or more characteristics, determine one or more alternative actions corresponding to the one or more characteristics. For instance, by generating synthetic training data based on the determined alternative actions corresponding to one or more characteristics (e.g., of the available training data), the system may train a machine learning model on such synthetic training data such that the machine learning model is configured to output predictions that are of a different type of data from that of the available training data.

As an example, in the context of generating recommendations for a user to eat healthier where the available training data is related to the user's historical eating habits, the available training data may include only unhealthy meals the user has previously eaten over a period of time. As with existing systems' reliance on large and rich datasets, providing a recommendation for a healthier meal for the user to eat (and at what time to eat such meal) may prove difficult as the available training data is keyed towards only unhealthy meals of the user. However, using the novel methods and systems disclosed herein, the system may determine one or more characteristics of the user's eating habits (e.g., what meals the user has eaten, at which times the user has eaten, the calorie counts of such meals, or other patterns associated with the available training data) and may determine one or more alternative actions corresponding to the one or more characteristics (e.g., a different meal, a different time to eat a given meal, a meal having decreased calories, etc.) by performing web scraping to generate synthetic training data. For instance, the synthetic training data may comprise the characteristics (e.g., of the available training data) and the alternative actions corresponding to the characteristics. By performing web scraping to determine alternative actions that correspond to the one or more characteristics, the system may generate synthetic training data while expanding the available training data to include the alternative actions (and the relationships of such alternative actions with respect to the corresponding characteristics of the available training data). This synthetically generated training data may be used to train a machine learning model to output predictions that are not directly associated with the available training data (e.g., as the web scraping may discover alternative meals or actions that were not known in the available training data). Accordingly, the methods and systems may expand the utilization of machine learning models and the applications in which machine learning models are used when available training data is sparse, as programmers are not limited to using machine learning models (or training thereof) only when available training data is large, robust, and rich.

In some aspects, methods and systems for generating synthetic training datasets for training machine learning models in training data-sparse environments for non-homogenous predictions are described. For example, the system may receive, via a remote database, user-specific information associated with a user. The system may then generate synthetic training data representing one or more alternative actions corresponding to one or more characteristics by: (i) labeling the user-specific information (e.g., where the labeling indicates an action of the user), (ii) determining, based on the labeled user-specific information, one or more characteristics of the labeled user-specific information, where the characteristics indicate a pattern associated with the user's actions, and (iii) determining, based on the one or more characteristics, one or more alternative actions corresponding to the one or more characteristics. The system may then train a machine learning model based on the synthetic training data. The system may then generate a prediction via the machine learning model, in response to providing an action of a first user to the machine learning model, wherein the prediction indicates a recommended second action.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

Figure 1A:
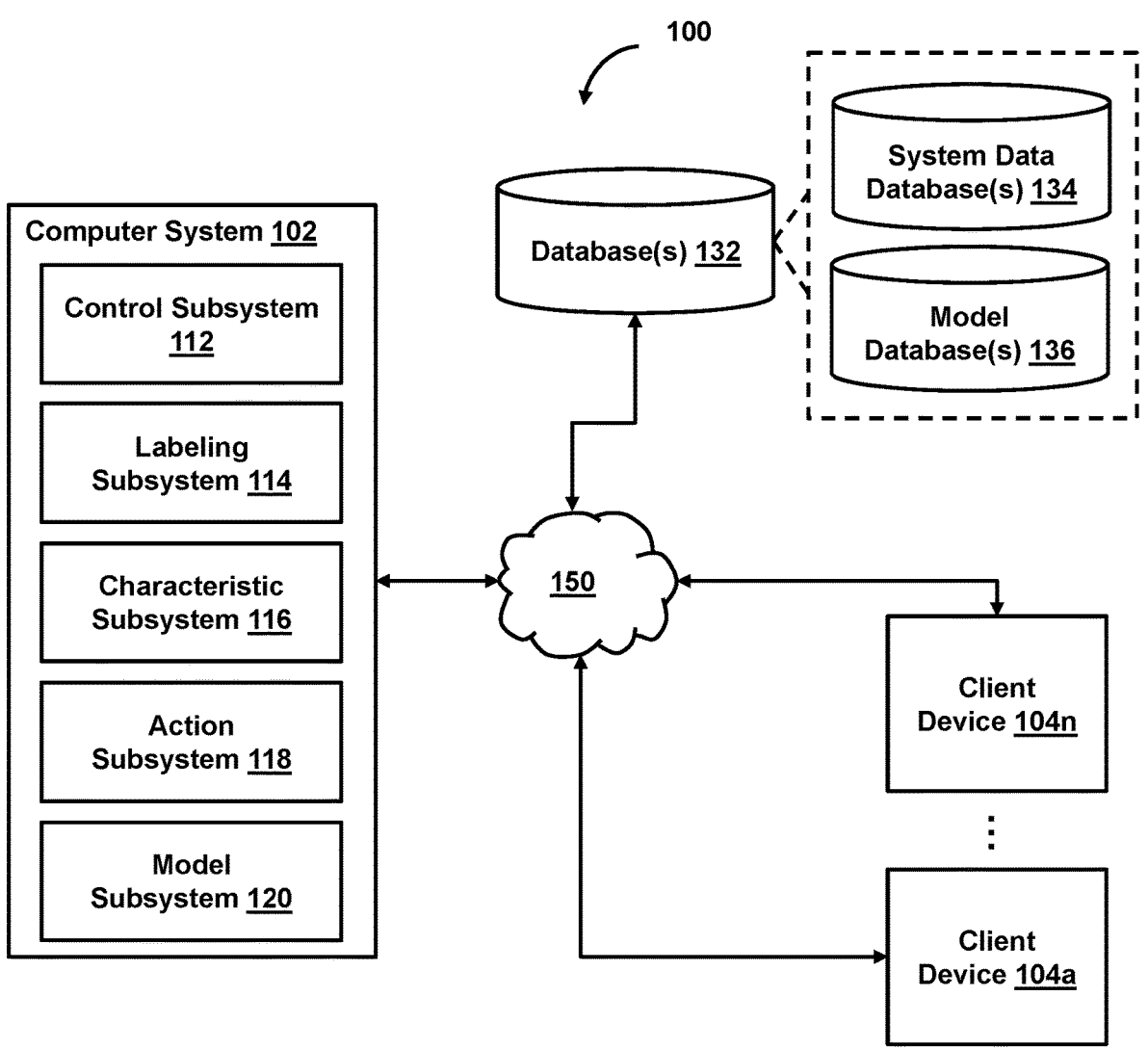
FIG. 1A shows an illustrative diagram for generating synthetic training datasets for training machine learning models in training data-sparse environments for non-homogenous predictions, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention. FIG. 1A shows an illustrative diagram for generating synthetic training datasets for training machine learning models in training data-sparse environments for non-homogenous predictions, in accordance with one or more embodiments. For example, system 100 may indicate a system for generating synthetic training datasets for training machine learning models in training data-sparse environments for non-homogenous predictions. For example, FIG. 1A illustrates a computer system 102 for (i) determining one or more characteristics of user-specific information and (ii) determining one or more alternative actions corresponding to the one or more characteristics to generate synthetic training data to train a machine learning model. For example, by first determining one or more characteristics of user-specific information (e.g., one or more patterns associated with the user-specific information, one or more frequencies of actions associated with the user-specific information, one or more temporal conditions of actions associated with the user-specific information, or other characteristics of the user-specific information), the system may then determine one or more alternative actions corresponding to the one or more characteristics (e.g., one or more alternative patterns associated with the user-specific information, one or more alternative frequencies of actions associated with the user-specific information, one or more alternative temporal conditions of actions associated with the user-specific information, or one or more other alternative actions associated with the user-specific information corresponding to the one or more characteristics). As such, the system may use the one or more alternative actions (e.g., corresponding to the one or more characteristics) to generate synthetic training data, thereby expanding the available training data (e.g., the user-specific information) to allow more robust machine learning model training in training data-sparse environments.

The system may be used to generate synthetic data. As referred to herein, "synthetic data" may include information that is artificially generated rather than produced by real-world events. In some embodiments, the synthetic data may include information obtained via one or more resources (e.g., the World Wide Web, one or more databases, one or more synthetic data generation algorithms, etc.). In some embodiments, the synthetic data may include newly created data that is not directly taken from the real world. In some embodiments, the synthetic data may include data that is associated with real-world data but is newly created data that is not keyed towards specific real-world events; rather, the newly created data may be keyed towards alternative events and/or actions that occur in different applications or environments.

The system may be used to train machine learning models for non-homogeneous predictions. As referred to herein, "non-homogeneous predictions" may include machine learning model predictions that are not uniform. For example, non-homogeneous predictions may be predictions that are not of a same "type" of data with respect to the training data on which the machine learning model is trained. For instance, a machine learning model may generate a non-homogeneous prediction when generating a prediction that is not directly related to the training data used to train the machine learning model. As an example, a machine learning model trained on a set of colors may be configured to generate a homogenous prediction of a color when the input to the machine learning model is a first color (e.g., the color blue is provided to a machine learning model trained on different colors to predict whether the input color is blue). In the same context, a non-homogenous prediction may be a prediction related to which shade or contrast of blue the color is (e.g., 50% contrast, periwinkle blue, etc.).

In some embodiments, a non-homogenous prediction may include predictions for which available training data does not include elements, items, or information that may appear in the non-homogenous prediction. For example, where the available training data includes user-specific information of what time a user wakes up on Mondays, a non-homogenous prediction may indicate a prediction of what time a user wakes up on Tuesday (e.g., the available training data does not include times the user wakes up on Tuesdays, however the machine learning model is configured to generate a prediction indicating what time a user may wake up on Tuesday).

The system may be used to provide predictions and/or recommendations via a user interface of a user device to a user. As referred to herein, a "user interface" may comprise a human-computer interaction and communication in a device, and may include display screens, keyboards, touch screens, a mouse, and the appearance of a desktop. For example, a user interface may comprise a way a user interacts with an application or a website.

The system may be used to label user-specific information. As referred to herein, "user-specific information" may comprise data actively and/or passively collected about a user. For example, the user-specific information may comprise information related to the user such as demographic information, personal information, medical information, financial information, behavioral information, actions the user partakes in, the user's habits, or other information that is related to or describes a user. As referred to herein, an "action" may include any action the user may perform or any interaction the user may have. For example, an action may include a behavior of a user, an interaction of the user (e.g., with respect to an entity, item, person, locations, etc.), or other action or interaction a user may perform or have. Additionally, as referred to herein, an "entity" may be any organization, institution, establishment, body, company, merchant, service provider, or other entity. For example, a user may interact or perform one or more actions with respect to an entity. Additionally, entities may "correspond" to one another. As referred to herein, a "corresponding entity" may be an entity that is (i) a same entity or (ii) an entity that shares a common trait as another entity. As an example, an entity may be a corresponding entity to another entity when the entities share the common trait of each being environmentally friendly, being women owned, providing a similar service, providing similar items, providing similar categories of items (e.g., personal care items, food, electronics, etc.), or other trait that may be shared between one entity and another.

In some embodiments, the system may label user-specific information by performing natural language processing (NLP) on user-specific information. For example, by labeling user-specific information by performing NLP, the system may automatically determine one or more tags (e.g., used to label the user-specific information), thereby reducing the amount of time in which existing systems label data, and also increasing the speed at which a machine learning model may be trained on user specific data. Moreover, by using NLP to label user-specific information, the labels (e.g., tags or other labels) may include contextual information of the user-specific information, thereby increasing the accuracy to which user-specific information is labeled. Additionally or alternatively, the system may label user-specific information by performing optical character recognition (OCR) on the user-specific information. For example, by labeling user-specific information by performing OCR, the system may automatically determine one or more tags (e.g., used to label the user-specific information) when the user-specific information is not in a parseable format (e.g., where the user-specific information is a pdf document, OCR may enable the system to parse through the user-specific information to determine one or more labels or tags).

The system may also determine one or more characteristics of the user-specific information. As referred to herein, a "characteristic" may include information about a user and/or one or more patterns or habits associated with actions of the user. For example, a characteristic may be a pattern associated with one or more actions of a user, one or more behaviors of a user, frequencies of actions/behaviors of a user, interactions the user has with respect to an entity or item, a pattern of one or more values associated with items the user has interacted with, or other patterns or other information associated with user-specific information.

In some embodiments, the system may determine one or more characteristics of the user-specific information based on timestamps associated with respective actions of the user. For example, by determining the one or more characteristics of the user-specific information based on timestamps associated with respective actions of the user, the system may determine whether the user performs a pattern of actions that correspond to a time period. Additionally or alternatively, the system may determine the one or more characteristics of the user-specific information based on a plurality of values associated with corresponding entities with respect to a time period. For example, by determining the one or more characteristics of the user-specific information based on a plurality of values associated with corresponding entities with respect to a time period, the system may determine whether the user overspends on items corresponding to one or more entities with respect to a time period. Additionally or alternatively, the system may determine the one or more characteristics of the user-specific information based on whether the user conducts an action with respect to a first time period. For example, by determining the one or more characteristics of the user-specific information based on whether the user conducts an action with respect to a first time period, the system may determine whether the user conducts a pattern of actions that occur frequently. Additionally or alternatively, the system may determine one or more characteristics of the user-specific information by providing the user-specific information to a machine learning model. For example, by determining the one or more characteristics of the user-specific information using a machine learning model, the system may determine robust characteristics of the user-specific information that do not fit conventional user behavioral patterns.

The system may be used to determine one or more alternative actions. As referred to herein, an "alternative action" may be any different action, interaction, or behavior with respect to a given characteristic. In some embodiments, an alternative action may correspond to a characteristic (e.g., of user-specific information). For example, where a characteristic indicates that a user walks to a store on a Tuesday afternoon, an alternative action may be walking to the store on a Tuesday morning (or other day or time). As another example, where a characteristic indicates that a user checks their online bank account every morning, an alternative action may be checking their online bank account every other morning or every night. In some embodiments, an alternative action may be actions, interactions, or behaviors that other users (e.g., different from that of a first user) may partake in.

In some embodiments, the system may determine one or more alternative actions corresponding to one or more characteristics by determining a match between a set of predetermined alternative actions corresponding to one or more second characteristics. For example, by determining a match between a set of predetermined alternative actions corresponding to one or more second characteristics, the system may reduce the amount of computer processing and memory resources required to determine alternative actions (e.g., as determining such alternative actions are based on a match as opposed to generating new alternative actions). Additionally or alternatively, the system may determine one or more alternative actions corresponding to one or more characteristics by performing web scraping based on the one or more characteristics. For example, by determining the one or more alternative actions corresponding to the one or more characteristics by performing web scraping, the system may determine alternative action-related information that the system does not have previously stored, thereby expanding the available training data on which a machine learning model may be trained to generate non-homogenous predictions in training data-sparse environments.

As shown in FIG. 1A, system 100 may include computer system 102, client device 104 (or client device(s) 104*a*-104*n*), or other components. Computer system 102 may include control sub system 112, labeling sub system 114, characteristic sub system 116, action sub system 118, model subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine learning model in one or more embodiments).

As shown in FIG. 1A, each of the components in system 100 may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a Universal Serial Bus (USB) port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein. Each of the components shown in system 100 may also receive content and data via input/output (I/O) paths and may also include processors and/or control circuitry to send and receive commands, requests, and other suitable data using the I/O paths. For example, the I/O paths may be either wireless (e.g., short-range wireless technology, Bluetooth®, Wi-Fi®, cellular signals, and/or any other wireless communication paths) or wired (e.g., ethernet, cable, coaxial cable, USB connections, and/or any other wired communication paths) communication paths for transmitting and receiving data. The control circuitry may comprise any suitable processing circuitry. Each of the components in system 100 may also include a user input interface and/or display for use in receiving and displaying data.

System 100 also includes computer system 102. Computer system 102 may be a computing system (e.g., a server) that includes one or more subsystems. For example, control subsystem 112 may be configured for controlling one or more operations or transmitting/receiving data between one or more components of system 100. Additionally, control subsystem 112 may be configured for obtaining or receiving user-specific information for a user (or one or more users), generating synthetic training data, generating (e.g., for display) recommendations via one or more user interfaces, or other functions associated with generating synthetic data training sets for training machine learning models in training data-sparse environments for non-homogenous predictions. Labeling subsystem 114 may be configured to label a set of data. For example, labeling subsystem 114 may label information, label data, label user-specific information of a user, label user-specific information of one or more users, or label any other information or data. As another example, labeling subsystem 114 may label data (e.g., user-specific information) by one or more labeling algorithms (e.g., automatic data labeling algorithms) or one or more manual labeling techniques (e.g., a user may label training data) such that the labels indicate properties or characteristics of a given object, behavior, action, or interaction of a portion of data being labeled. Characteristic subsystem 116 may be configured to determine one or more characteristics of data. For example, characteristic subsystem 116 may be configured to determine, based on labeled user-specific information, one or more characteristics of the labeled user-specific information. For instance, the one or more characteristics may indicate a pattern associated with the user-specific information. Action subsystem 118 may be configured to determine, generate, or create one or more alternative actions. For example, action subsystem 118 may determine, based on one or more characteristics (e.g., of the user-specific information, of the labeled user-specific information, etc.), one or more alternative actions corresponding to the one or more characteristics. For instance, action subsystem 118 may perform web scraping or obtain other information from a database to determine the one or more alternative actions corresponding to the one or more characteristics. Model subsystem 120 may be configured to host, receive, transmit, or train one or more machine learning models. For example, model subsystem 120 may be configured to obtain a machine learning model from model database 136 to generate one or more predictions related to recommendations, one or more suggestions, one or more actions, or other predictions.

System 100 also includes client devices 104a-104n, which may be referred to collectively as client device(s) 104. In some embodiments, client device 104 may correspond to client device 200 (FIG. 2) or mobile device 322 (FIG. 3) below. Client device(s) 104 may refer to any computing device, including, but not limited to, smartphones, cellular devices, smart watches, wearable devices, pagers, laptop computers, tablet computers, hand-held computers, "smart" devices, wireless devices, and/or other mobile devices. In some embodiments, client device(s) 104 may be capable of receiving or transmitting one or more requests to/from computer system 102 or database(s) 132.

System 100 also includes database 132. Database 132 may be associated with other databases, such as system data database 134 and model database 136. Database 132, system data database 134, and model database 136 may be referred to as any electronic storage capable of storing data. Each database shown in system 100 (e.g., database 132, system data database 134, and model database 136) may include one or more electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein. Such databases may also receive content and data via I/O paths. Additionally, each of the components shown in system 100 may communicate with database 132 (or system data database 134/model database 136) to store or retrieve information included in database 132.

System data database 134 may be configured to store system-related information. For example, the system-related information may include user-specific information of a user, user-specific information of a plurality of users, identifiers associated with the plurality of users, or other system-related information, in accordance with one or more embodiments. Model database 136 may be configured to store one or more machine learning models. For example, the one or more machine learning models may be pre-trained machine learning models or may be un-trained machine learning models. Such machine learning models may be configured to generate predictions related to (i) one or more recommendations, (ii) one or more suggestions, (iii) one or more recommended actions, (iv) one or more recommended behaviors, or one or more other predictions. In some embodiments, the machine learning models may be trained based on training data stored in model database 136. Additionally or alternatively, where model subsystem 120 requests a machine learning model from model database

136, such machine learning model may be transmitted over network 150 such that model subsystem 120 may train the obtained machine learning model.

System 100 also includes communications network 150. As used herein, "communications network" and "network" may be used interchangeably. Network 150 may include the Internet, a mobile phone network, a mobile voice or data network (e.g., a 5G or LTE network), a cable network, a public switched telephone network, or other types of communications networks or combinations of communications networks. The network may include both wired and wireless connections, as well as other short-range point-to-point communication paths, such as USB cables, IEEE 1394 cables, wireless paths (e.g., short-range wireless technology, infrared, IEEE 802.11x, etc.), or other short-range communication via wired or wireless paths. It should be noted that network 150 is merely illustrative. In some embodiments, the components shown in system 100 may interact with one another via network 150. In some embodiments, the components shown in system 100 may interact with one another directly (e.g., without the use of network 150) via one or more communication paths (or communication networks) between each component. In other embodiments, the components shown in system 100 may interact with one another indirectly (e.g., with the use of network 150 via one or more communication paths (or communication networks)) such that all data/information is transmitted and received via network 150.

Figure 1B:
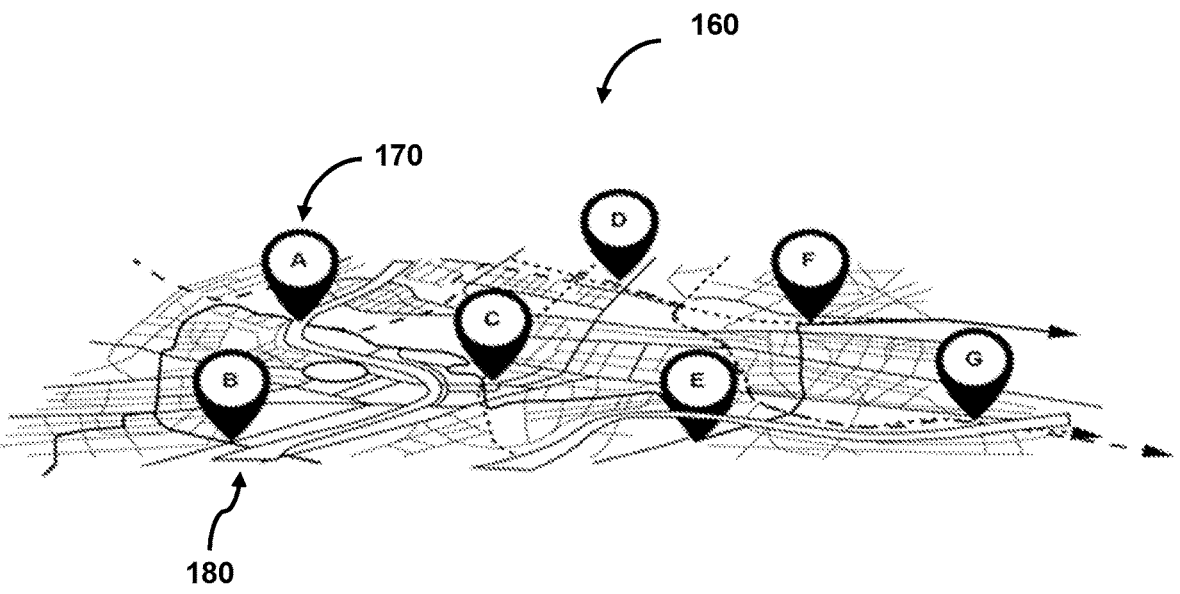
FIG. 1B shows an illustrative map diagram for generating synthetic training datasets for training machine learning models in training data-sparse environments for non-homogenous predictions, in accordance with one or more embodiments.

FIG. 1B shows an illustrative map diagram for generating synthetic training datasets for training machine learning models in training data-sparse environments for non-homogenous predictions, in accordance with one or more embodiments. Illustrative map diagram 160 may include one or more locations. As referred to herein, a "location" may be any geographic location. For example, a location may include Global Positioning System (GPS) coordinates, an address, zip code, state, or other location-based information. For example, illustrative map diagram 160 may include a first location 170 and a second location 180. In some embodiments, first location 170 may correspond to one or more characteristics of user-specific information (e.g., a location of a user, a location where a user conducted an action, or other location associated with a user) and second location 180 may be associated with an alternative action of the user (e.g., a recommended location, a recommended location where a user should go, a recommended location of an entity, or other recommended location-related information).

Figure 2:
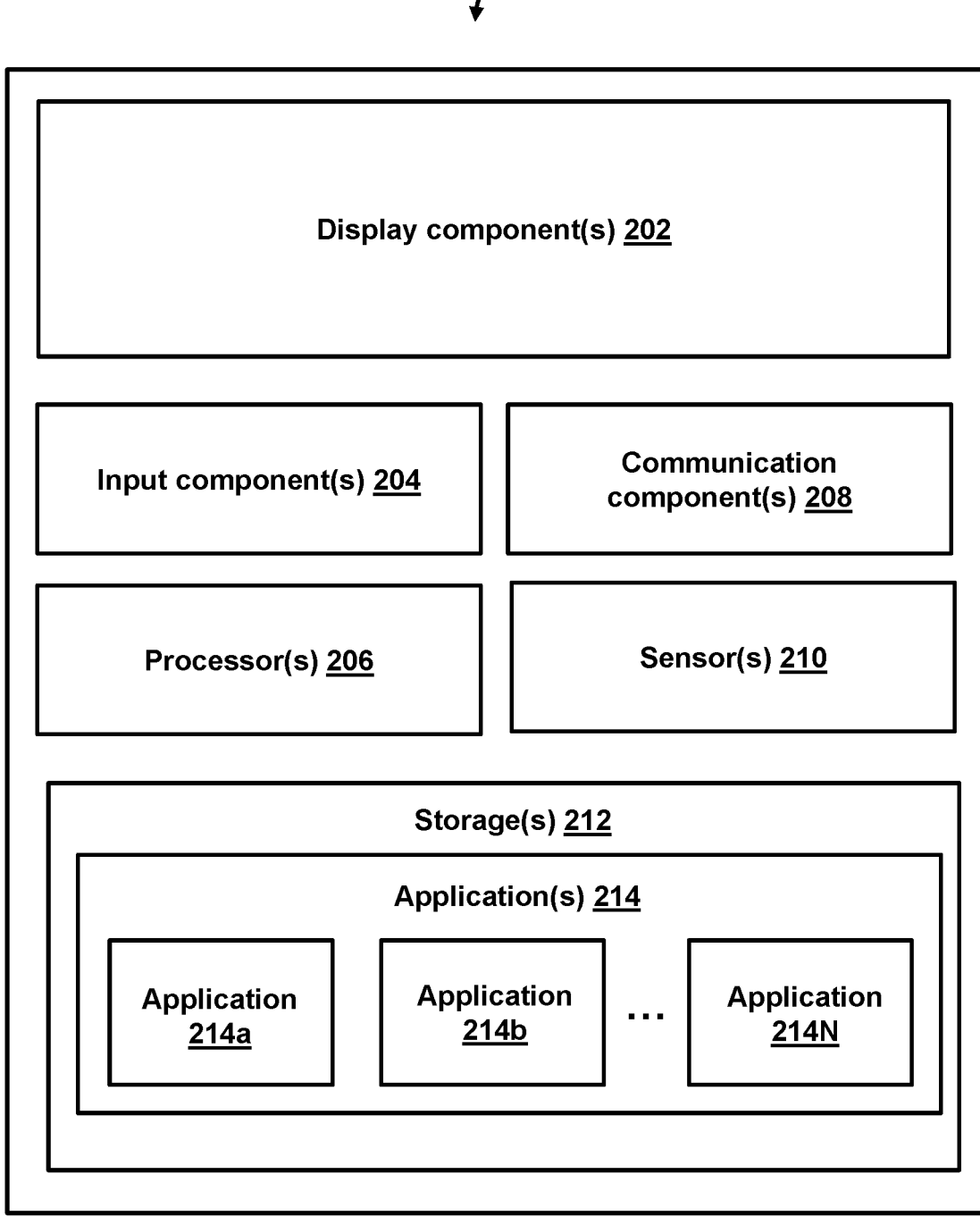
FIG. 2 shows a client device, in accordance with one or more embodiments.
Figure 3:
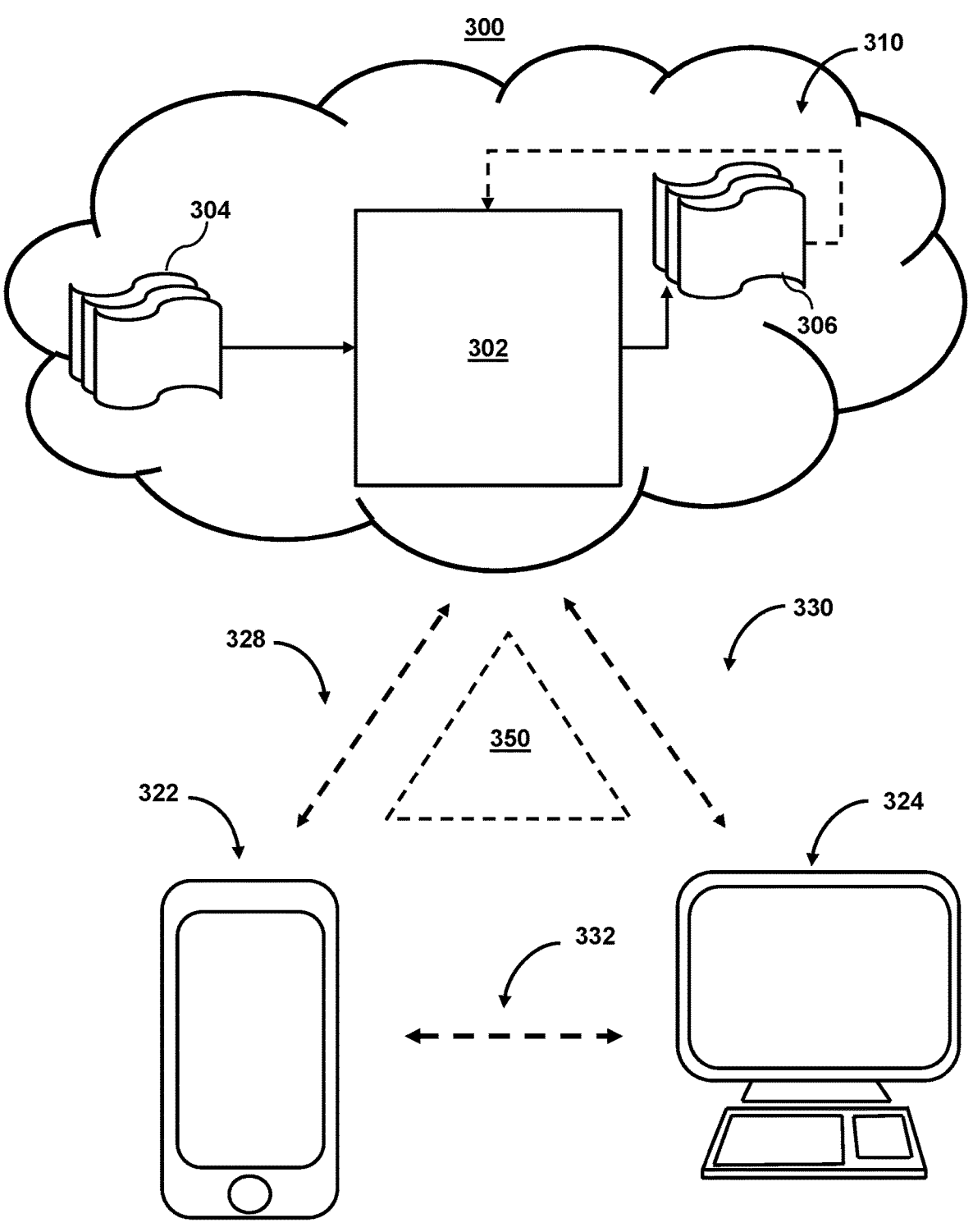
FIG. 3 shows illustrative components for a system used for generating synthetic training datasets for training machine learning models in training data-sparse environments for non-homogenous predictions, in accordance with one or more embodiments.

FIG. 2 shows a client device, in accordance with one or more embodiments. In some embodiments, one or more operations related to generating synthetic training datasets for training machine learning models in training data-sparse environments for non-homogenous predictions may be performed by client device 200. In some embodiments, client device 200 may correspond to client device 104 (FIG. 1A) and mobile device 322 (FIG. 3). Client device 200 may include a plurality of components, such as display component(s) 202, input component(s) 204, processor(s) 206, communication component(s) 208, sensor(s) 210, storage(s) 212, application(s) 214, or other components. In some embodiments, display component(s) 202 may be configured for displaying content to a user. For example, content may include any multimedia such as images, videos, text, website content, suggestions, recommendations, actions, or other multimedia. In some embodiments, display component(s) 202 may include displaying visual representations of website content (e.g., one or more webpages) or other content.

Input component(s) 204 may be configured to receive input from a user via components such as a touch screen, buttons, USB connections, floppy disks, CDs, DVDs, or other input components. Processor(s) 206 may include one or more computer processors configured to control one or more operations, functions, or computer program instructions. Communication component(s) 208 may be configured to facilitate communication of data (e.g., operations, functions, instructions, etc.) between one or more components of client device 200 via wired or wireless connections (e.g., ethernet, Bluetooth®, Near-Field Communication (NFC), FireWire®, USB, Wi-Fi®, or other communication connections). Sensor(s) 210 may include one or more sensors such as image sensors, Global Positioning System (GPS) sensors, microphones, gyroscopes, accelerometers, barometers, proximity sensors, ambient light sensors, or other sensors. Storage(s) 212 may include one or more electronic storages configured to store computer program instructions, applications, information, user-specific information, multimedia, or other data. In some embodiments, storage(s) 212 may store a variety of applications. For example, applications 214a-214n may represent different applications stored on client device 200. As another example, application 214 may be an application that is associated with an account service provider. For instance, the account service provider may be an entity (e.g., a business, company, merchant, or other entity) that may have a dedicated application configured as a user interface to allow a user to interact with one or more account services of the account service provider. For example, application 214 may be configured to allow a user to perform one or more account-related actions or other actions/operations consistent with one or more embodiments.

FIG. 3 shows illustrative components for a system used to generate synthetic training datasets for training machine learning models in training data-sparse environments for non-homogenous predictions, in accordance with one or more embodiments. For example, the system of FIG. 3 may show illustrative components for generating robust machine learning model training data when available training datasets are limited or insufficient for an intended application. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. Additionally, in some embodiments, it should be noted that mobile device 322 may correspond to client device 200 (FIG. 2) or client device 104 (FIG. 1A), in accordance with one or more embodiments. Similarly, in some embodiments, it should be noted that user terminal 324 may correspond to client device 200 (FIG. 2) or client device 104 (FIG. 1A), in accordance with one or more embodiments. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., recommendations, predictions, suggestions, offers, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include one or more components of system 100 (e.g., computer system 102). Additionally, cloud components 310 may access database 132, system data database 134, or model database 136, or may be connected to the Internet for additional information or data resources.

Cloud components 310 may include model 302, which may be a machine learning model, artificial intelligence model, deep learning model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a recommendation, a suggestion, a recommended action, a recommended behavior, a recommended interaction with an entity, a recommended interaction with an item, a recommended frequency, a personalized subscription offer, or other prediction in accordance with one or more embodiments).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a recommended action, a recommended behavior, a recommendation for a user with respect to an entity, a recommended action for a user with respect to an entity, a recommended behavior for a user with respect to an entity, a personalized subscription offer, etc.).

In some embodiments, the model (e.g., model 302) may automatically perform actions based on outputs 306. In some embodiments, the model (e.g., model 302) may not perform any actions. The output of the model (e.g., model 302) may be used to provide one or more recommendations to the user (e.g., recommendations, recommended actions, a recommended behavior, a recommendation for a user with respect to an entity, a recommended action for a user with respect to an entity, a recommended behavior for a user with respect to an entity, a suggestion, a suggested action, a personalized subscription offer, or other recommendations).

In some embodiments, model 302 may be configured to output a recommendation. For example, model 302 may be trained based on information (e.g., training information) stored in system data database 134 (FIG. 1A), model database 136 (FIG. 1A), or other information (e.g., information obtained via the Internet) to generate predictions related to a recommended action for a user. For example, model 302 may take in user-specific information, one or more determined characteristics of the user-specific information, or one or more determined alternative actions corresponding to the one or more characteristics as input 304, and generate an output 306 indicating a recommended action (e.g., for a user). For example, model 302 may learn (e.g., during training) one or more relationships between data associated with training information and determine one or more recommended (or suggested) actions. In some embodiments, the one or more recommended (or suggested) actions may be related to an action of a user, an action of a user with respect to an entity, a behavior of a user, a behavior of a user with respect to an entity, or other recommendations/suggestions.

In some embodiments, subsequent to training, model 302 may be provided with an action of a user as input 304, and may generate a prediction related to a recommended second action as output 306. As an example, where the input is an action indicating that a user purchases gas on Monday mornings, the output may be a recommendation to purchase gas on Wednesday mornings (e.g., as gas is cheaper during the middle of the week as opposed to the beginning of the week). As another example, where the input is an action indicating that a user purchases a beverage at a particular first merchant, the output may be a recommendation indicating to purchase the same beverage at a second merchant (e.g., because the second merchant sells the beverage for a cheaper price). As such, the output 306 (e.g., the predictions, recommendations, suggestions, etc.) may then be processed (e.g., by one or more components of system 300 or system 100 (FIG. 1A)) such that a user may be provided with the output 306.

System 300 also includes Application Programming Interface (API) layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may employ incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

Figure 4:
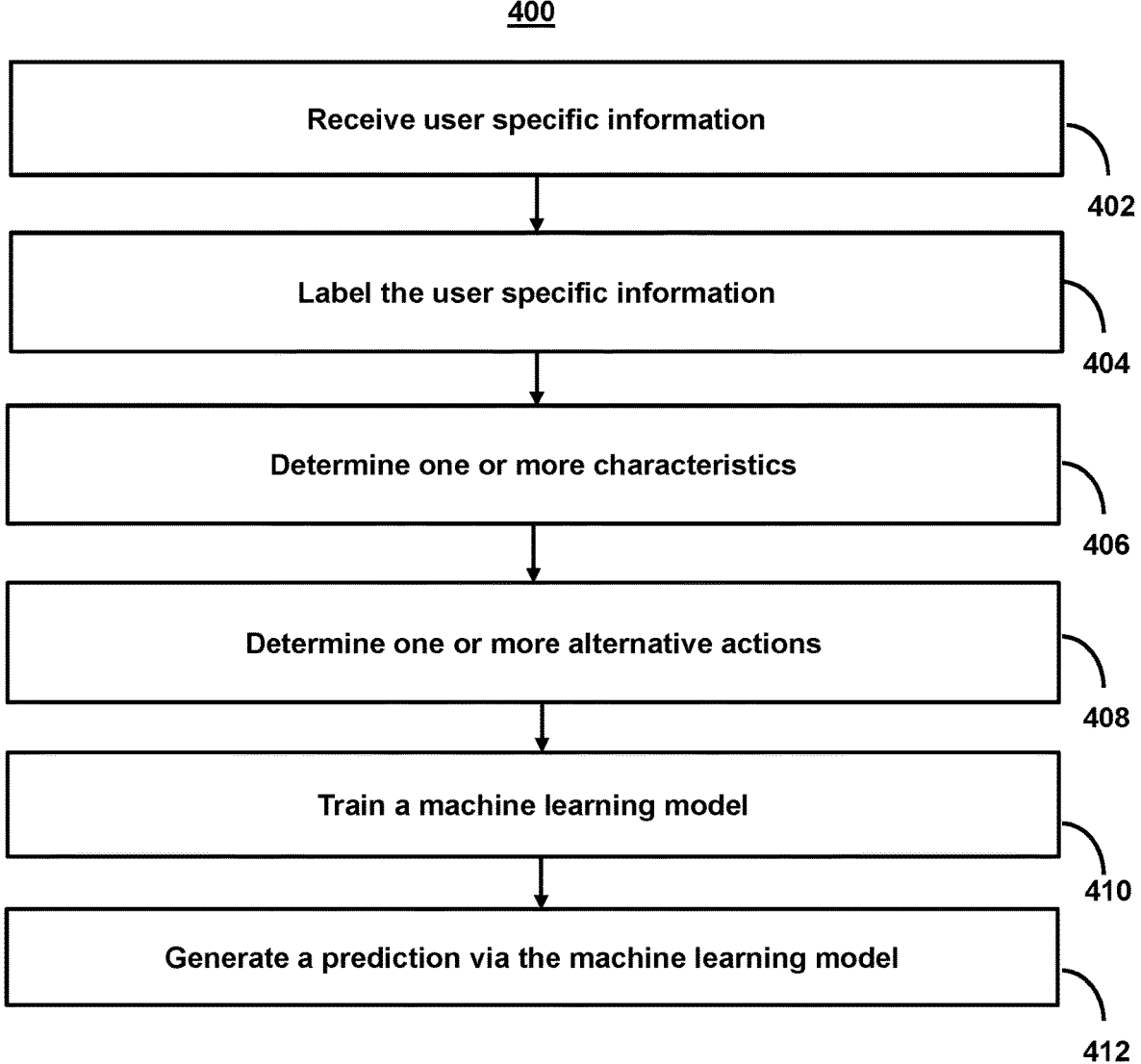
FIG. 4 shows a flowchart of the steps involved in generating synthetic training datasets for training machine learning models in training data-sparse environments for non-homogenous predictions, in accordance with one or more embodiments.

FIG. 4 shows a flowchart of the steps involved in generating synthetic training datasets for training machine learning models in training data-sparse environments for nonhomogenous predictions, in accordance with one or more embodiments. For example, the system may use process 400 (e.g., as implemented on one or more system components described above) in order to provide one or more recommended actions to a user.

At step 402, process 400 (e.g., using one or more components described above) may receive user-specific information. For example, the system may receive, via a remote database, user-specific information associated with one or more users. For example, user-specific information may be stored in a database that is the same as or similar to system data database 134 (FIG. 1A). The user-specific information may include information that is related to one or more actions of a user. For example, the actions may include behaviors of a user, behaviors of a user with respect to an entity, location information of a user, location information with respect to a given time period (e.g., where a user was located on a given day), what the user purchases (and/or where or what entity a user purchases items from), time-stamp information of an action, or other actions that are associated with a user. By retrieving user-specific information from a remote database, the system may reduce the amount of computer processing resources required to obtain the user-specific information from other resources (e.g., querying the user for information, generating user-specific information via the Internet, etc.).

For example, where the user-specific information includes financial-related actions of a user, the system may retrieve the financial-related actions from the remote database. For example, the financial-related actions may include information pertaining to historical transactions that are associated with the user (e.g., a transaction history of the user). The historical transactions may include transaction information such as an amount a user spent on an item, quantities of items purchased, the location at which the user completed the transaction (e.g., GPS coordinates, address, zip code, state identifier, country identifier), an entity identifier (e.g., Merchant Category Code (MCC), business name, company identifier, abbreviated merchant name, etc.), total amount spent, item identifiers (e.g., item categories, item Universal Product Code (UPC), serial numbers, item names, etc.), or other transaction-related information.

At step 404, process 400 (e.g., using one or more components described above) labels the user-specific information. For example, the system may label the user-specific information where the labeling indicates an action of the user. For instance, the system may label the user-specific information where the labeling indicates a behavior of a user with respect to an entity. As raw user data is not necessarily suitable for training machine learning models, especially in training data-sparse environments, the system may label user specific data as a preprocessing step to enable a machine learning model to be trained on such labeled data. Furthermore, as raw user data is complex in nature to label, by labeling the user data indicating a given behavior of a user with respect to an entity, the system may process the user data to generate robust training datasets for machine learning models. As such, the system may label the user specific data, which, as will be explained later, allows an efficient extraction of one or more characteristics of user data to aid in generating synthetic training data.

In some embodiments, labeling the user-specific information may be based on natural language processing (NLP). For example, the system may perform NLP on the user-specific information to determine one or more tags associated with the user-specific information. Where the user-specific information is textual information (e.g., in the format of text or alphanumeric characters), performing NLP may be advantageous as NLP may determine the context in which a user action is performed. Such contextual information may be important to determine accurate labels (e.g., tags) to use for labeling the user-specific information to deduce one or more characteristics. The tags may indicate one or more actions of the user with respect to an entity, one or more behaviors of the user with respect to an entity, or one or more interactions of the user with respect to an entity. Using the one or more tags (e.g., as determined by the NLP of the user-specific information), the system may label the user-specific information based on (or alternatively, with) the one or more tags. By doing so, the system may generate contextually accurate labels for the user-specific information.

In one use case, where the user-specific information is a transaction history of the user, the system may perform NLP on the user's transaction history to determine one or more tags associated with the user's transaction history. For example, the transaction history may include actions of the user (e.g., purchases, returns, or other transactions) with respect to an entity (e.g., a merchant, business, company, or other entity). The system may perform lemmatization and stemming; topic modeling; keyword extraction; sentiment analysis; text summarization; tokenization; generation of knowledge graphs, word clouds, or bags of words; or other NLP methods on the transaction history of the user to determine one or more actions of the user with respect to an entity. By using NLP on the user's transaction history, the system may determine accurate tags to label the transaction history of the user that includes the context in which one or more transactions have occurred. For example, the NLP may output a set of tags (e.g., alphanumeric characters, phrases, or other values) associated with each transaction of the transaction history of the user, which may include the amount a user spent (e.g., in total, on a particular item, etc.), an item identifier (e.g., a name of an item, a category of an item, etc.), a service identifier (e.g., a name of a service provided by an entity, a category of a service provided by an entity, etc.), a location at which the user transacted with an entity (e.g., address, zip code, state, GPS coordinates, etc.), an entity identifier (e.g., merchant name, company name, MCC, etc.), a timestamp at which a transaction occurred (e.g., time, date, etc.), or other keywords and/or values associated with a transaction. Using the set of tags, the system may label the transaction history of the user. In this way, the system may process the transaction history of the user with contextually accurate labels to enable the system to determine one or more characteristics of the user's transaction history.

In some embodiments, labeling the user-specific information may be based on optical character recognition (OCR) of the user-specific information. For example, the system may perform OCR on the user-specific information to determine one or more tags associated with the user-specific information, where the one or more tags indicate one or more actions (e.g., behaviors, interactions, etc.) of the user with respect to an entity. The system may then label, based on the one or more tags, the user-specific information of the user. By doing so, the system may label user specific data that is not in a computer-readable format (e.g., a pdf that is searchable, a document that is searchable, or other file format that can be parsed), thereby reducing the amount of computer processing resources required to parse information that is not in a computer-readable format.

In one use case, where the user-specific information are includes user-uploaded documents (e.g., receipts, images, or other documents or multimedia), the system may perform OCR on the user-uploaded documents to identify textual information within the user-uploaded documents. For example, the user may upload one or more receipts to an account associated with the user. Since the receipts may be in the format of a pdf document, an image, or other format where parsing of the receipt may be difficult, the system may perform OCR on the receipts to identify one or more characters, phrases, sentences, values, or other information from the receipts to determine one or more tags of the user-specific information. Upon performing the OCR of the receipts, the system may extract (or otherwise determine) one or more tags from the receipts to label the user-specific information of the user indicating one or more actions of the user (e.g., a transaction) with respect to an entity (e.g., a merchant). The tags, as discussed above, may indicate a variety of information such as amount a user spent, an item identifier, a service identifier, a location at which the user transacted with an entity, an entity identifier, a timestamp at which a transaction occurred, or other keywords and/or values associated with a transaction.

At step 406, process 400 (e.g., using one or more components described above) may determine one or more characteristics. For example, the system may determine, based on the labeled user-specific information, one or more characteristics of the labeled user-specific information. As an example, the characteristics of the user-specific information may be a pattern associated with the user's actions, a frequency at which a user performs actions, interactions that a user has with a given entity, financial information related to a user's actions, entity information (e.g., an entity identifier, entity name, etc.) associated with a user's actions, behaviors of the user associated with the user-specific information, locations a user visits or at which a user performs one or more actions, or other characteristics or information that is associated with the user-specific information of a user. For instance, the system may determine whether a user behaved in a particular way on a given day, whether the user spent money on a particular item, whether the user spent money at a given merchant, or other actions that may fit a pattern. Additionally or alternatively, the system may determine one or more action outliers (e.g., actions or behaviors that don't fit a pattern). By doing so, the system may determine patterns that are related to a user's behavior to later enable the system to determine alternative actions that may correspond to a characteristic (e.g., if the user eats fried food every other day of the week, the system may determine an alternative action of eating salads every other day of the week, etc.).

In some embodiments, the system may determine the one or more characteristics of the user-specific information based on a temporal pattern. For example, the system may identify, based on the labeled user-specific information, a plurality of timestamps (e.g., times and dates) associated with respective actions of the user. The plurality of timestamps may be determined via the tags of the labeled user-specific information. For example, the system may parse the labels associated with the labeled user-specific information to determine whether a pattern exists between actions of the user and the times at which actions of the user occur. The system may then determine, based on the plurality of timestamps, whether the plurality of timestamps correspond to a threshold time pattern. The threshold time pattern may indicate a pattern of actions with respect to a predetermined time. For instance, the threshold time pattern may be a minimum or maximum amount of time that passes between one action and another action. As an example, where the threshold time pattern is one day, if a first action occurs on Oct. 15, 2022, at 5:00 am ET and a second action occurs on Oct. 16, 2022, at 5:00 am ET, the system may compare a difference in time between the first action and the second action (e.g., one day) and compare it to a threshold time pattern (e.g., indicating a pattern of actions with respect to a predetermined time). In response to the plurality of timestamps corresponding to the threshold time pattern, the system may determine a first characteristic. For example, the first characteristic may be that a user performs a time-based pattern of an action. In some embodiments, the plurality of timestamps may correspond to the threshold time pattern when the plurality of timestamps meet or exceed a predetermined time period. In other embodiments, the plurality of timestamps may correspond to the threshold time pattern when the plurality of timestamps fail to meet or exceed a predetermined time period. Additionally or alternatively, the plurality of timestamps may correspond to the threshold time pattern when the actions that correspond to a given timestamp are associated with a second action of another timestamp. For example, to determine a pattern, the actions themselves (e.g., what the user does, where the user is located, what interaction the user has with a given entity) may be the same as or similar to that of another action. In this way, the system may determine a time-based pattern of actions of a user, thereby improving the user experience as more accurate alternative actions may be suggested.

As an example, where the user-specific information is a transaction history of a user, the system may determine characteristics of the transaction history of the user. For instance, the system may parse the labeled transaction history to determine a plurality of timestamps of respective purchases of the user. The system may then determine which purchases are associated with one another. For example, the system may compare each action of the user (e.g., transaction) to each other action of the user to determine which transactions occurred at the same location (e.g., merchant) and, of those transactions occurring at the same location, to determine whether the item(s) purchased are the same item. Additionally or alternatively, the system may compare each action of the user to each other action of the user to determine which transactions occurred at the same location and, of those transactions occurring at the same location, to determine whether the item(s) purchased are different items. Additionally or alternatively, the system may also compare each action of the user to each other action of the user to determine whether the items purchased at different merchants are the same items. As an example, the system may determine that the user purchased food from a first restaurant every Monday during October. The system may then compare the timestamps (e.g., indicating the user purchased food on Mondays during October from the first merchant) to a threshold time pattern. For example, where the threshold time pattern is a weekly basis for a given action with respect to a month, the system may determine that the plurality of timestamps correspond to the threshold time pattern. As such, the system may determine that the user purchases food every Monday in the month of October from the first merchant (e.g., the characteristic) and may store the characteristic in a database (e.g., system data database 134) for later processing when determining alternative actions.

In some embodiments, the system may determine the one or more characteristics of the user-specific information based on a plurality of values associated with corresponding entities. For example, the system may identify, based on the user-specific information, a plurality of values associated with corresponding entities, with respect to a first time period. The plurality of values may be any value associated with an action conducted at a given entity such as the time a user spends at an entity's location, GPS coordinates of an entity, a timestamp, an amount spent at an entity, or other value associated with actions with respect to an entity. The system may identify the plurality of values based on the labeled user-specific information (e.g., the tags of the user-specific information). Additionally, the first time period may be a predetermined time period such as 1 day, 2 days, 1 week, 2 weeks, 1 month, 2 months, 1 year, 2 years, or other time period. Additionally, the corresponding entities may be entities that are the same, or entities that are otherwise associated (e.g., the same category of entities). For example, where the user-specific information is a transaction history of the user, the system may determine how much money the user spent at a given merchant during a month (e.g., via a merchant identifier, via location information (first location 170 (FIG. 1A), etc.). As another example, where the user-specific information is a transaction history of the user, the system may determine how much the user spent at restaurants during a week. The system may then determine, based on the plurality of values associated with the corresponding entities, whether the plurality of values satisfy a threshold value with respect to a second time period. For example, the system may determine, for a given merchant, whether the plurality of values (e.g., the amount spent per transaction, the total amount spent at the given merchant, etc.) satisfy a threshold value (e.g., threshold amount spent per transaction, a total threshold amount spent at the merchant, etc.) with respect to a second time period. The second time period may be a predetermined time period (e.g., 1 day, 2 days, 1 week, 2 weeks, 1 month, 2 months, 1 year, 2 years, etc.). In some embodiments, the second time period may be the same time period of the first time period to deduce a spending pattern associated with the user. Additionally, the threshold value may be satisfied if the plurality of values meet or exceed the threshold value. In response to the plurality of values satisfying the threshold value, the system may determine a first characteristic (e.g., a spending pattern). In this way, the system may determine characteristics of the user-specific information to enable the generation of synthetic training data in training data-sparse environments.

In some embodiments, determining the one or more characteristics of the user-specific information may be based on a machine learning model. For example, the system may provide the labeled user-specific information to a machine learning model configured to determine one or more patterns associated with the user-specific information. The machine learning model may output one or more characteristics based on a determined pattern. For instance, the machine learning model may be a Neural Network, Recurrent Neural Network, Convolutional Neural Network, Support Vector Machine, deep learning model, or other machine learning model configured to determine patterns of user-specific information. For instance, the machine learning model may be a pre-trained machine learning model obtained via a database (e.g., model database 136 (FIG. 1A)). In other embodiments, the machine learning model may be an untrained machine learning model. For example, an un-trained machine learning model may be trained based on user-specific information to determine one or more characteristics (e.g., patterns, features, or other information) associated with the user-specific information. As user-specific information is often complex in nature due to the varying patterns, using a machine learning model to determine characteristics of the user-specific information may be advantageous and may reduce the amount of time required to determine characteristics of the user-specific information while also improving the user experience.

In some embodiments, determining the one or more characteristics of the user-specific information may be based on a frequency. For example, the system may identify, based on the user-specific information, a frequency at which the user conducts (e.g., performs) a first action with respect to a first time period. For instance, the system may parse through the labeled user-specific information to identify a frequency at which the user conducts an action with respect to a first time period. That is, the frequency may be a number of times a user performs an action and the first time period may be a predetermined time period on which the system bases the frequency. For example, where the first time period is 1 month, the system may determine the frequency at which the user conducted (or otherwise performed) an action within a 1-month time span. The system may then determine, based on the frequency, whether the frequency satisfies a threshold frequency with respect to the first time period. As determining the number of times a user conducts an action may vary based on the time period on which the action is based, the threshold frequency may be associated with the first time period. For example, a user may go to the grocery store twice a month, however, when viewed from the 6-month time period, the user may go to the grocery store 12 times. As such, the system may determine whether the frequency satisfies a threshold frequency with respect to the first time period. The threshold frequency may be satisfied if the frequency (e.g., at which the user performs an action) meets or exceeds the threshold frequency. In other embodiments, the threshold frequency may be satisfied if the frequency fails to meet or exceed the threshold frequency. In response to the frequency satisfying the threshold frequency, the system may determine a characteristic of the user-specific information. In this way, the system may determine frequency-based patterns of user actions, thereby enabling the system to generate robust synthetic training data in training data-sparse environments.

As an example, where the user-specific information is a transaction history of the user, the system may identify a frequency at which the user conducted a transaction. For instance, the system may identify a frequency at which the user conducted a transaction with respect to a given merchant or with respect to a corresponding merchant (e.g., similar merchants, merchants sharing a common trait, merchants providing a same category of items, etc.). For example, to accurately determine how many times a user purchased goods from a given merchant, the system may determine how many times the user purchased items or services from a given merchant based on the tags of the transaction history of the user. For instance, the system may compare each transaction of the user's transaction history to determine a set of transactions that correspond to the same merchant. The system may then determine how many times the user has conducted a transaction with that merchant with respect to a time period (e.g., a day, month, year, etc.). For example, the system may determine that the user has purchased fast food from a given restaurant 5 times a month. As some frequencies are not necessarily indicative of a pattern (or other characteristic of the user's transaction history), the system may compare the frequency (e.g., at which the user has conducted transactions with a given merchant) to a threshold frequency with respect to the first time period. For example, the threshold frequency may be 8 times per month. In such a case, the threshold frequency may not be satisfied (e.g., as the user purchased fast food from the restaurant only 5 times in a given month as compared to the threshold frequency of 8 times for the given month). However, if the user purchased fast food from the given restaurant 10 times for that given month, the threshold frequency may be satisfied. As such, the system may determine a spending pattern with respect to the frequency at which the user has purchased fast food from the given merchant. In some embodiments, the frequency at which the user conducts a transaction with a merchant may be irrespective of the item purchased. For example, where the user purchases personal care items at a first merchant during a first transaction, the user may also purchase clothing items from the first merchant during a second transaction. Although the items purchased are different, the user nonetheless transacted with the first merchant twice, therefore, the frequency may be 2. In this way, the system may determine robust spending patterns of a user, thereby enabling the system to generate more robust synthetic training data in training data-sparse environments.

At step 408, process 400 (e.g., using one or more components described above) may determine one or more alternative actions (e.g., alternative behaviors, alternative entities, alternative actions associated with alternative entities, alternative behaviors associated with alternative entities, etc.). For example, the system may determine, based on the one or more characteristics, one or more alternative actions corresponding to the one or more characteristics. As generating synthetic training data in training data-sparse environments is often difficult, there is a need to use the available data to help generate more robust, synthetic, machine learning model training data. For example, as machine learning models are often trained on large datasets to reduce system errors, discover hidden relationships in the data, and generate accurate predictions, when the training data available is small, the machine learning model may output inaccurate or otherwise insignificant predictions. However, by leveraging the available training data, determining characteristics of the available training data, and determining alternative actions corresponding to the characteristics of the available training data, the system may generate more robust training data, thereby enabling a machine learning model to be trained on an expanded dataset from the available training dataset and generate accurate and robust predictions based on synthetic data.

In some embodiments, the system may determine one or more alternative actions corresponding to the one or more characteristics based on information from a remote database. For example, the system may retrieve a set of predetermined alternative actions corresponding to one or more characteristics from a remote database (e.g., system data database 134). The remote database may store information related to actions that other users have performed that are each associated with a characteristic (e.g., a pattern of actions, a pattern of behaviors, a pattern of values, etc.), predetermined actions that are offered by an entity that correspond to a characteristic, or other information. The system may determine a match between the characteristics (e.g., of the user-specific information) and the characteristics stored in the remote database (e.g., system data database 134 (FIG. 1A)). In response to determining a match between a characteristic of the user-specific information and a characteristic stored in the remote database, the system may determine an alternative action for the characteristic of the user-specific information that corresponds to the match. For example, the system may determine, based on the match, the alternative action (e.g., stored in the remote database) that corresponds to the matching characteristic between the user-specific information and the characteristic of the remote database. In this way, the system may reduce the amount of computer processing and memory resources required to determine alternative actions as determining such alternative actions may be based on a match between characteristics of the user-specific information and the characteristics of alternative actions as stored in the remote database. Additionally, the system may also generate synthetic training data (e.g., the alternative actions corresponding to the one or more characteristics) in training data-sparse environments.

In one use case, where the user-specific information is a transaction history of the user and the predetermined alternative actions corresponding to other characteristics are offers from a merchant that are related to items and/or services, the system may retrieve the offers as stored in the database. For example, the offers may be subscription-based offers that a user may purchase (e.g., for $75 you can get 1 coffee a day at Bob's Coffee for the entire month of March). Such subscription-based offers may be related to the characteristics of the user-specific information (e.g., if the user is consistently spending money at Bob's Coffee, the system may determine an alternative action of a subscription-based offer for Bob's Coffee). The system may then determine a match between the patterns determined in the transaction history of the user (e.g., the user spends $100 on fast food at a first restaurant, the user buys food 5 times a month from the first restaurant, the user buys food from the first restaurant every other day, etc.) and offers from that merchant that match the patterns. For example, the offer (e.g., the alternative action) may be "save $5 by purchasing a healthy meal" that corresponds to the characteristic of a user spending $100 (or other amount) on fast food from the first restaurant. That is, each offer (or alternative action) may correspond to a pattern in which a user is known to partake. In response to determining the match, the system may determine an alternative action corresponding to the match of the characteristics between the transaction history of the user and the characteristics of the offers.

In some embodiments, the system may determine the one or more alternative actions corresponding to the one or more characteristics based on a plurality of values. For example, the system may perform web scraping, based on the one or more characteristics (e.g., of the user-specific information), to determine a plurality of values associated with a set of entities. The plurality of values may indicate a respective amount associated with an item. As an example, the amount may be a frequency, a cost, a weight, or other value associated with an item with respect to an entity. For example, the plurality of values may be the cost of an item provided by a given merchant. The system may then determine, based on the plurality of values associated with the set of entities, whether a first value of the plurality of values satisfies a threshold value. The threshold value may be a predetermined value (e.g., a predetermined cost, frequency, weight, or other value associated with an item). Additionally or alternatively, the threshold value may be the value of an item or service that is associated with the characteristic of the user-specific information. For example, where the user-specific information indicates a pattern associated with a user's spending habit, such as the user spending $5 a day on coffee at a particular merchant, the threshold value may be $5 (e.g., as indicated by the user's spending habits). The system may then determine whether a value associated with the plurality of values satisfies the threshold value. For example, the web scraping may return a set of coffee merchants offering coffee for varying prices. The system may compare the price of coffee from the web-scraped merchants to how much the user is spending on coffee to determine which coffees from the web-scraped merchants cost less than the amount the user is currently spending. The threshold value may be satisfied when the value as indicated by the characteristic (e.g., of the user-specific information) meets or exceeds the web-scraped values associated with items provided by the respective entities. In response to the first value satisfying the threshold value, the system may determine an alternative action based on the first value and the entity corresponding to the first value. For example, where an alternative merchant offers coffee for less than what the user is currently spending on coffee, the system may determine an alternative action (e.g., purchase the coffee from the alternative merchant). Additionally, the system may store such alternative actions in a database (e.g., system data database 134 (FIG. 1A)). In this way, the system may determine alternative actions for the user based on web-scraped information, thereby expanding the available training dataset to train more robust and accurate machine learning model predictions while generating synthetic training data in training data-sparse environments.

In some embodiments, determining the one or more alternative actions corresponding to the one or more characteristics may be based on a time period. For example, the system may perform web scraping, based on the one or more characteristics, to determine a plurality of services associated with a set of entities with respect to a first time period. As some offers are time-dependent (e.g., saving a user money on a given item or service during a particular day, week, month, year, etc.), the system may determine, based on the user's spending patterns, whether any alternative offers (e.g., alternative actions) exist that may benefit the user (e.g., save the user money, save the user time, etc.). In the case of time-dependent offers, naturally, these offers are associated with a time period (e.g., a day, week, month, year, etc.). Therefore, the system may determine the plurality of services (or items) offered by the set of entities with respect to the first time period. The first time period may be a predetermined time period. Additionally or alternatively, the first time period may be based on the current date. For example, the system may determine the current date (e.g., using one or more computer clocks, or timekeeping devices) and may web scrape for offers based on the current date to determine offers (i) on the current date or (ii) in the future. Upon determining the plurality of services associated with the set of entities with respect to the first time period, the system may determine whether the first time period satisfies a threshold time period. For example, the threshold time period may be a predetermined time period (e.g., the current date, a week from the current date, a month from the current date, etc.). In response to the first time period satisfying the threshold time period, the system may determine one or more alternative actions based on the plurality of services associated with the set of entities with respect to the first time period. For example, as the web scraping may return a set of merchants offering a given product or service at a discounted price, the system may "check" whether the offers are in the future. Additionally or alternatively, based on the characteristics of the user-specific information, the system may also determine a value associated with a given item that the user is spending to determine a time-dependent offer that is cheaper than the amount the user is currently spending. For instance, where the user is spending an average of $20 on a cup of coffee at a first coffee merchant, the system may determine whether (i) the first coffee merchant or (ii) other coffee merchants are offering a deal on coffee the following week, month, or year. In response to (i) the first coffee merchant or (ii) the other coffee merchants offering a deal (e.g., cheaper coffee) on coffee in the future, the system may determine such offers as alternative actions. Additionally, the system may store such alternative actions in a database (e.g., system data database 134 (FIG. 1A)). In this way, the system may determine time-dependent alternative actions, thereby expanding the available training dataset to train more robust and accurate machine learning model predictions while generating synthetic training data for training data-sparse environments.

In some embodiments, determining the one or more alternative actions corresponding to the one or more characteristics may be based on a frequency. For example, the system may perform web scraping, based on the one or more characteristics, to determine a plurality of services (or items) associated with a set of entities with respect to a frequency. The frequency may indicate a number of occurrences of an action associated with a respective service. For example, where the one or more characteristics are user spending patterns based on a user's transaction history, the system may perform web scraping to determine whether a frequency-based offer for an item or service exists. That is, the system may perform web scraping to determine whether an item or service identified in the user-specific information (e.g., transaction history of the user) may have a frequency-based offer (e.g., a deal on an item/service if the user purchases X amount of the item/service from a given company, merchant, or other entity). For example, where the system performs web scraping based on a characteristic of the user's transaction history, such as the user purchasing coffee every day from a given merchant, the system may return a set of merchants offering a deal on coffee. The offer may be indicative of a frequency such as "if you purchase 5 cups of coffee, you get one free" or "sign up for our coffee subscription for $1 off every coffee you purchase." The system may then determine, based on the plurality of services associated with the set of entities (e.g., with respect to the frequency), whether the frequency satisfies a threshold frequency. For example, the threshold frequency may indicate a number of occurrences of an action associated with the one or more characteristics. For instance, the threshold frequency may indicate how frequently a user purchases an item or service (e.g., based on the user's transaction history or spending habits). The system may compare the frequency of the offer (e.g., the web-scraped information) to the frequency of the user's spending habits for an item/service to determine whether the frequency of the offer meets or exceeds that of the user's spending habit for an item/service. In some embodiments, if the frequency of the offer meets or exceeds that of the user's spending habit for an item/service, the frequency may satisfy the threshold frequency. For instance, if the offer's frequency (e.g., the amount of an item or service to be purchased from an entity) meets or exceeds that of the user's spending habit frequency for an item/service, the offer may encourage the user to spend more on a given item/service. In some embodiments, however, frequency (e.g., of the offer for an item/service) may satisfy the threshold frequency (e.g., of the user's spending habit for an item/service) when the frequency fails to meet or exceed the threshold frequency. In response to the frequency satisfying the threshold frequency, the system may determine the one or more alternative actions based on the services and entities satisfying the threshold frequency. For example, the system may store the frequency-based offer in a database (e.g., system data database 134 (FIG. 1A)). By doing so, the system may generate synthetic training data in training data-sparse environments.

In some embodiments, determining the one or more alternative actions corresponding to the one or more characteristics may be based on an anticipated result. For example, the system may perform web scraping, based on the one or more characteristics, to determine a plurality of services (or items) associated with a set of entities with respect to an anticipated result. The anticipated result may indicate a reduction of a value associated with a service provided by a respective entity. For example, the system may perform web scraping based on the user's transaction history (e.g., one or more patterns of the user's transactions) to determine a set of services (or items) provided by entities that are on sale (e.g., a cheaper price, a deal, etc.). For example, the system may use a user's spending pattern associated with a given item or service, and perform web scraping to find other matching items/services that are on sale. The system may then determine, based on a value associated with the anticipated result, whether the anticipated result satisfied a threshold value. For example, the value associated with the anticipated result may be a price of an item or a service provided by an entity (e.g., determined by the web scraping). The threshold value may indicate a threshold-reduced value associated with the one or more characteristics. For example, the system may determine a user spending pattern for a given item and may determine an average price for that item. The system may then compare the value associated with the anticipated result (e.g., the price of an item/service offered by an entity) to the threshold-reduced value (e.g., the average price of an item the user is currently spending), and if the value associated with the anticipated result fails to meet or exceed the threshold-reduced value, the system may determine the one or more alternative actions based on the services (or items) and entities satisfying the threshold-reduced value. For example, the system may store the entities (and the corresponding items/services) that offer the items/services for a cheaper price in a database (e.g., system data database 134 (FIG. 1A)). By doing so, the system may generate synthetic training data in training data-sparse environments.

As another example, where the anticipated result is a time spent traveling, the system may perform web scraping based on a user's transaction history to determine a plurality of services (e.g., methods of travel) that may result in a reduction of time (e.g., spent traveling). For example, where the system determines that a user often takes the train from one location (e.g., first location 170 (FIG. 1A)) to another location (e.g., second location 180 (FIG. 1A)) based on the user's transaction history indicating train ticket purchases from the first location to the second location, the system may perform web scraping to determine alternative methods of travel that may reduce the time required for the user to travel to the second location from the first location. From the web-scraped alternative methods of travel, the system may compare the estimated time of arrival to the user's average time of arrival (e.g., via the train), and when an alternative method of travel is associated with an estimated time of arrival that is earlier than the average time of arrival (e.g., via the train), the system may determine such alternative method of travel as an alternative action.

At step 410, process 400 (e.g., using one or more components described above) may train a machine learning model. For example, the system may train a machine learning model based on synthetic training data. The synthetic training data may be related to the one or more alternative actions (e.g., determined above) that correspond to the one or more characteristics. For example, for each characteristic of the user specific data, the determined alternative actions may be associated with a respective characteristic. As such, during training, the machine learning model may discover and/or learn relationships between each characteristic (e.g., a user's spending pattern) and determined alternative actions (e.g., an action the user may take to save money). That is, determining the alternative actions corresponding to the one or more characteristics enables the system to leverage what training data is available (e.g., the user-specific information, transaction history of the user, etc.) and allows the generation of synthetic training data (e.g., alternative actions corresponding to characteristics of the user-specific information). By doing so, the system may enable the machine learning model to be trained on an expanded (synthetic) training dataset, thereby causing more accurate and robust machine learning model predictions.

During model training, the synthetic training data (e.g., the user-specific information, the characteristics of the user-specific information, the alternative actions corresponding to the user-specific information) may be provided as input to the machine learning model. Additionally or alternatively, a user action (e.g., a transaction of the user, an intended transaction of the user, etc.) may be provided as input to the machine learning model. The machine learning model may output a prediction indicating a recommendation for the user based on the provided user action. For example, where the user action is an intended purchase of a chicken sandwich at a first restaurant, the machine learning model may output a recommendation of "purchase a chicken sandwich at a second restaurant to save $2." In some embodiments, the output (e.g., the recommendation) may be fed back as reference feedback information to the machine learning model to update one or more configurations of the machine learning model (e.g., parameters or weights) to generate more accurate predictions. In some embodiments, a user input may be provided to the machine leaning model based on the output (e.g., a label of the output) indicating an accurate recommendation such that the machine learning model may learn from the user input to generate more accurate recommendations. In this way, the machine learning model may be configured to accept an input (e.g., an intended transaction of the user, a transaction of the user, etc.) and provide an output (e.g., a recommendation, a recommended action, a recommended behavior, a personalized offer, etc.).

At step 412, process 400 (e.g., using one or more components described above) may generate a prediction via the machine learning model. For example, the system may generate a prediction via the machine learning model, in response to providing an action of a first user to the machine learning model. The prediction may indicate a recommended second action. For example, the system may provide an action of the user to the machine learning model to generate a recommended action for the user. For instance, the system may provide a transaction of the user to the machine learning model to generate a recommendation on how the user may save money. Where the transaction is the user spending $25 for a taxi using a first taxi provider, the machine learning model may output a recommendation indicating that the user should take the train, walk, or take a second taxi provider (e.g., offering the same taxi ride for a reduced rate). Additionally or alternatively, the system may provide an intended transaction of the user to the machine learning model to generate a recommendation. For example, the user may interact with a user interface via an application associated with a service provider (e.g., a bank, credit service, financial institution, etc.) and may input an intended transaction. Using the intended transaction, the system may provide the intended transaction to the machine learning model to generate a recommendation (e.g., whether the user should purchase an item/service via a different merchant). Moreover, the recommendation (e.g., as output-ted by the machine learning model) may be a subscription offer. For instance, where the system provides the transaction history of a user to the machine learning model, the machine learning model may output a subscription-based offer recommendation to the user to enable the user to save money. By doing so, the system may generate accurate, personalized recommendations for a user, thereby improving the user experience.

In some embodiments, the system may generate for display, via a user interface, the recommended action. For example, the system may generate for display, via a user interface associated with a user device of the user, the recommended second action. The user may be interacting with an application that is associated with a service provider (e.g., a bank, credit service, financial institution, etc.) and upon the system generating the recommended second action (e.g., the recommendation for the user), the system may display the recommended second action on the user interface of the application. By doing so, the user may decide whether to act on the recommendation, thereby improving the user experience.

In some embodiments, the system may receive a user input corresponding to the second action. For example, the system may receive, via the user device associated with the user, a user input corresponding to the second action. For example, the user may accept or decline the second action (e.g., a personalized recommendation). In some embodiments, the system may perform a third action based on the user input corresponding to the second action. For example, where the user accepts or declines the personalized recommendation, the system may automatically purchase an item/ service as indicated in the recommendation. Additionally or alternatively, where the recommendation is a personalized subscription-based offer, the system may also generate a virtual payment card and bind the personalized subscription-based offer to the virtual payment card. For example, the virtual payment card may be bound to the personalized subscription-based offer such that the virtual payment card may only be used for purchases (or other transactions) associated with the entity to which the personalized subscription-based offer is offered from. For instance, where the entity that is associated with the personalized subscription-based offer, such as Bob's coffee, the user may only be allowed to use the virtual payment card at Bob's coffee. Additionally or alternatively, the virtual payment card may be bound to the personalized subscription-based offer such that the virtual payment card may only be used for purchases (or other transactions) associated with the item and/or entity to which the personalized subscription-based offer is based on. For example, where the personalized subscription-based offer is for Bob's Coffee to purchase bagels (e.g., a certain amount of bagels, an unlimited amount of bagels, for a certain time frame for purchasing bagels, etc.), the user may only be able to use the virtual payment card to buy bagels (and not other items) from Bob's Coffee. By binding the virtual payment card to the personalized subscription-based offer, the system may monitor the user's spending with respect to the offer (and/or virtual payment card), which may reduce fraud as the virtual payment card may only be used with respect to the personalized subscription-based offer.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, via a remote database, user-specific information associated with a user; generating synthetic training data representing one or more alternative actions corresponding to one or more characteristics by: labeling the user-specific information, wherein the labeling indicates an action of a user; determining, based on the labeled user-specific information, one or more characteristics of the labeled user-specific information, wherein the characteristics indicate a pattern associated with the user's actions; determining, based on the one or more characteristics, one or more alternative actions corresponding to the one or more characteristics; training a machine learning model based on the synthetic training data; and generating a prediction via the machine learning model, in response to providing an action of a first user to the machine learning model, wherein the prediction indicates a recommended second action.

2. The method of the preceding embodiment, wherein labeling the user-specific information further comprises: performing natural language processing on the user-specific information to determine one or more tags associated with the user-specific information, wherein the user-specific information indicates one or more actions of the user with respect to an entity; and labeling, based on the one or more tags, the user-specific information of the user.

3. The method of any one of the preceding embodiments, wherein labeling the user-specific information further comprises: performing optical character recognition on the user-specific information to determine one or more tags associated with the user-specific information, wherein the user-specific information indicates one or more actions of the user with respect to an entity; and labeling, based on the one or more tags, the user-specific information of the user.

4. The method of any one of the preceding embodiments, wherein determining the one or more characteristics of the labeled training data further comprises: identifying, based on the labeled user-specific information, a plurality of timestamps associated with respective actions of the user; determining, based on the plurality of timestamps, whether the plurality of timestamps correspond to a threshold time pattern, wherein the threshold time pattern indicates a first pattern of actions with respect to a predetermined time; and in response to the plurality of timestamps corresponding to the threshold time pattern, determining a first characteristic.

5. The method of any one of the preceding embodiments, wherein determining the one or more characteristics of the labeled training data further comprises: identifying, based on the labeled user-specific information, a plurality of values associated with corresponding entities, with respect to a first time period; determining, based on the plurality of values associated with corresponding entities, whether the plurality of values satisfy a threshold value with respect to a second time period; and in response to the plurality of values satisfying the threshold value, determining a first characteristic.

6. The method of any one of the preceding embodiments, wherein determining the one or more characteristics of the labeled training data further comprises: providing the labeled user-specific information to a second machine learning model to determine one or more patterns associated with the user-specific information; and determining, based on the determined pattern, a first characteristic.

7. The method of any one of the preceding embodiments, wherein determining the one or more characteristics of the labeled training data further comprises: identifying, based on the labeled user-specific information, a frequency at which the user conducts a first action with respect to a first time period; determining, based on the frequency, whether the frequency satisfies a threshold frequency with respect to the first time period; and in response to the frequency satisfying the threshold frequency, determining a first characteristic.

8. The method of any one of the preceding embodiments, wherein determining the one or more alternative actions corresponding to the one or more characteristics further comprises: retrieving, from the remote database, a set of predetermined alternative actions corresponding to one or more second characteristics; determining a match between the one or more characteristics and the one or more second characteristics; and in response to determining a match between the one or more characteristics and the one or more second characteristics, determining the one or more alternative actions corresponding to the match.

9. The method of any one of the preceding embodiments, wherein determining the one or more alternative actions corresponding to the one or more characteristics further comprises: performing web scraping, based on the one or more characteristics, to determine a plurality of values associated with a set of entities, wherein the plurality of values indicate a respective amount associated with an item; determining, based on the plurality of values associated with the set of entities, whether a first value of the plurality of values satisfies a threshold value, wherein the threshold value indicates a threshold amount of the item; and in response to the first value satisfying the threshold value, determining an alternative action based on the first value and the entity corresponding to the first value.

10. The method of any one of the preceding embodiments, wherein determining the one or more alternative actions corresponding to the one or more characteristics further comprises: performing web scraping, based on the one or more characteristics, to determine a plurality of services associated with a set of entities with respect to a first time period; determining, based on the plurality of services associated with the set of entities with respect to the first time period, whether the first time period satisfies a threshold time period, wherein the threshold time period is associated with the one or more characteristics; and in response to the first time period satisfying the threshold time period, determining the one or more alternative actions based on the plurality of services associated with the set of entities with respect to the first time period.

11. The method of any one of the preceding embodiments, wherein determining the one or more alternative actions corresponding to the one or more characteristics further comprises: performing web scraping, based on the one or more characteristics, to determine a plurality of services associated with a set of entities with respect to a frequency, wherein the frequency indicates a number of occurrences of an action associated with a respective service; determining, based on the plurality of services associated with the set of entities with respect to the frequency, whether the frequency satisfies a threshold frequency, wherein the threshold frequency indicates a number of occurrences of a second action associated with the one or more characteristics; and in response to the frequency satisfying the threshold frequency, determining the one or more alternative actions based on the services and entities satisfying the threshold frequency.

12. The method of any one of the preceding embodiments, wherein determining the one or more alternative actions corresponding to the one or more characteristics further comprises: performing web scraping, based on the one or more characteristics, to determine a plurality of services associated with a set of entities with respect to an anticipated result, wherein the anticipated result indicates a reduction of a value associated with a service provided by a respective entity; determining, based on a value associated with the anticipated result, whether the value associated with the anticipated result satisfies a threshold value, wherein the threshold value indicates a threshold-reduced value associated with the one or more characteristics; and in response to the value associated with the anticipated result satisfying the threshold value, determining the one or more alternative actions based on the services and entities satisfying the threshold value.

13. The method of any one of the preceding embodiments, further comprising: generating for display, via a user interface associated with a user device of the user, the recommended second action.

14. The method of any one of the preceding embodiments, further comprising: receiving, via a user device associated with the user, a user input corresponding to the second action; and performing a third action based on the user input corresponding to the second action.

15. A tangible, non-transitory, machine-readable medium storing instructions that, when executed by a data processing apparatus, cause the data processing apparatus to perform operations comprising those of any of embodiments 1-14.

16. A system comprising one or more processors; and memory storing instructions that, when executed by the one or more processors, cause the processors to effectuate operations comprising those of any of embodiments 1-14.

17. A system comprising means for performing any of embodiments 1-14.

What is claimed is:

1. A system for generating synthetic training datasets for use in training machine learning models to generate non-homogenous predictions based on sparse training data, the system comprising:

one or more processors and memories storing instructions that, when executed by the one or more processors, cause operations comprising:

in connection with generating synthetic training data to train a machine learning model to generate non-homogenous predictions respective to sparse user-specific information, receiving, over a computer network from a remote database, raw user-specific information indicating first behaviors of a first user respective to first entities extracting tags derived via computer processing of the raw user-specific information to label the raw user-specific information, wherein each extracted tag of the extracted tags indicate a first behavior of the first behaviors of the first user with respect to a first entity of the first entities;

subsequent to generating the synthetic training data based on one or more derived characteristics of the labeled raw user-specific information indicating patterns of the first behaviors derived from the extracted tags, inputting the synthetic training data to the machine learning model to train the machine learning model to generate the non-homogenous predictions based on one or more alternative behaviors part of the synthetic training data that (i) are different from the first behaviors of the first user, (ii) are associated with alternative entities, and (iii) correspond to the one or more characteristics of the labeled raw user-specific information;

inputting a second behavior of the first user with respect to a second entity into the machine learning model to obtain a non-homogenous prediction indicating a recommended third behavior for the first user with respect to a third entity, wherein the third behavior is different than the second behavior, and the third entity is different than the second entity; and transmitting, over the computer network, for display on a user interface associated with a first user device, the recommended third behavior for the first user with respect to the third entity.

2. A method for generating synthetic training datasets for use in training machine learning models to generate non-homogenous predictions based on sparse training data, the method comprising:

in connection with generating synthetic training data to train a machine learning model receiving, over a computer network from a remote database, user-specific information associated with a user;

extracting tags derived via computer processing of the user-specific information to label the user-specific information, wherein each extracted tag indicates a first action of the user;

subsequent to generating the synthetic training data based on one or more derived characteristics of the labeled user-specific information indicating patterns of the user's first actions, inputting the synthetic training data to the machine learning model to train the machine learning model to generate non-homogeneous predictions based on one or more alternative actions part of the synthetic training data that are different from the user's first actions of the user;

inputting a second action of the user into the machine learning model to obtain a non-homogenous prediction, wherein the non-homogenous prediction indicates a recommended third action different from the second action; and transmitting, over the computer network, for display on a user device associated with the user, the recommended third action.

3. The method of claim 2, wherein the computer processing of the user-specific information to label the user-specific information further comprises:

performing natural language processing on the user-specific information to extract the tags, wherein the user-specific information indicates one or more actions of the user with respect to an entity; and labeling the user-specific information of the user with the extracted tags.

4. The method of claim 2, wherein the computer processing of the user-specific information to label the user-specific information further comprises:

performing optical character recognition on the user-specific information to extract the tags, wherein the user-specific information indicates one or more actions of the user with respect to an entity; and labeling the user-specific information of the user with the extracted tags.

5. The method of claim 2, wherein the one or more derived characteristics of the labeled user-specific information is derived by identifying, based on the labeled user-specific information, a plurality of timestamps associated with respective actions of the user;

determining, based on the plurality of timestamps, whether the plurality of timestamps correspond to a threshold time pattern, wherein the threshold time pattern indicates a first pattern of actions with respect to a predetermined time; and in response to the plurality of timestamps corresponding to the threshold time pattern, deriving a first characteristic.

6. The method of claim 2, wherein the one or more derived characteristics of the labeled user-specific information is derived by:

identifying, based on the labeled user-specific information, a plurality of values associated with corresponding entities, with respect to a first time period;

determining, based on the plurality of values associated with the corresponding entities, whether the plurality of values satisfy a threshold value with respect to a second time period; and in response to the plurality of values satisfying the threshold value, deriving a first characteristic.

7. The method of claim 2, wherein the one or more derived characteristics of the labeled user-specific information is derived by:

providing the labeled user-specific information to a second machine learning model to determine one or more patterns associated with the user-specific information; and deriving, from the one or more patterns, a first characteristic.

8. The method of claim 2, wherein the one or more derived characteristics of the labeled user-specific information is derived by:

identifying, based on the labeled user-specific information, a frequency at which the user conducts a first action with respect to a first time period;

determining, based on the frequency, whether the frequency satisfies a threshold frequency with respect to the first time period; and in response to the frequency satisfying the threshold frequency, deriving a first characteristic.

9. The method of claim 2, wherein the one or more alternative actions part of the synthetic training data correspond to the one or more derived characteristics of the labeled user-specific information, and wherein the method further comprises:

retrieving, from the remote database, a set of predetermined alternative actions corresponding to one or more second characteristics;

determining a match between the one or more derived characteristics and the one or more second characteristics; and in response to determining the match between the one or more derived characteristics and the one or more second characteristics, determining the one or more alternative actions to based on the match.

10. The method of claim 2, wherein the one or more alternative actions part of the synthetic training data correspond to the one or more derived characteristics of the labeled user-specific information, and wherein the method further comprises:

performing web scraping, based on the one or more derived characteristics, to determine a plurality of values associated with a set of entities, wherein the plurality of values indicate a respective amount associated with an item;

determining, based on the plurality of values associated with the set of entities, whether a first value of the plurality of values satisfies a threshold value, wherein the threshold value indicates a threshold amount of the item; and in response to the first value satisfying the threshold value, determining an alternative action based on the first value and a respective entity corresponding to the first value.

11. The method of claim 2, wherein the one or more alternative actions part of the synthetic training data correspond to the one or more derived characteristics of the labeled user-specific information, and wherein the method further comprises:

performing web scraping, based on the one or more derived characteristics, to determine a plurality of services associated with a set of entities with respect to a first time period;

determining, based on the plurality of services associated with the set of entities with respect to the first time period, whether the first time period satisfies a threshold time period, wherein the threshold time period is associated with the one or more derived characteristics; and in response to the first time period satisfying the threshold time period, determining the one or more alternative actions based on the plurality of services associated with the set of entities with respect to the first time period.

12. The method of claim 2, wherein the one or more alternative actions part of the synthetic training data correspond to the one or more derived characteristics of the labeled user-specific information, and wherein the method further comprises:

performing web scraping, based on the one or more derived characteristics, to determine a plurality of services associated with a set of entities with respect to a frequency, wherein the frequency indicates a first number of occurrences of an action associated with a respective service;

determining, based on the plurality of services associated with the set of entities with respect to the frequency, whether the frequency satisfies a threshold frequency, wherein the threshold frequency indicates a second number of occurrences of a second action associated with the one or more derived characteristics; and in response to the frequency satisfying the threshold frequency, determining the one or more alternative actions based on the respective services and entities satisfying the threshold frequency.

13. The method of claim 2, wherein the one or more alternative actions part of the synthetic training data correspond to the one or more derived characteristics of the labeled user-specific information, and wherein the method further comprises:

performing web scraping, based on the one or more derived characteristics, to determine a plurality of services associated with a set of entities with respect to an anticipated result, wherein the anticipated result indicates a reduction of a value associated with a service provided by a respective entity;

determining, based on the value associated with the anticipated result, whether the value associated with the anticipated result satisfies a threshold value, wherein the threshold value indicates a threshold-reduced value associated with the one or more derived characteristics; and in response to the value associated with the anticipated result satisfying the threshold value, determining the one or more alternative actions based on the respective services and entities satisfying the threshold-reduced value.

14. The method of claim 2, further comprising:

receiving, via the user device associated with the user, a user input corresponding to the recommended third action; and performing a fourth action based on the user input corresponding to the recommended third action.

15. One or more non-transitory, computer-readable media comprising instructions that, when executed by one or more processors, cause operations comprising:

in connection with generating synthetic training data to train a machine learning model, extracting tags derived via computer processing of user-specific information associated with a user to label the user-specific information, wherein each extracted tag indicates an action of the user;

subsequent to generating the synthetic training data based on one or more derived characteristics of the labeled user-specific information, inputting the synthetic training data to the machine learning model to train the machine learning model to generate predictions based on one or more alternative actions part of the synthetic training data that are different from the user's actions; and transmitting, over a computer network, for display on a user device associated with the user, a third action obtained via the trained machine learning model, generated based on inputting a second action of the user to the machine learning model, the third action being different from the second action.

16. The non-transitory, computer-readable media of claim 15, wherein the computer processing of the user-specific information to label the user-specific information further comprises:

performing natural language processing on the user-specific information to extract the tags, wherein the user-specific information indicates one or more actions of the user with respect to an entity; and labeling the user-specific information of the user with the extracted tags.

17. The non-transitory, computer-readable media of claim 15, wherein the one or more derived characteristics of the labeled user-specific information is derived by:

identifying, based on the labeled user-specific information, a plurality of values associated with corresponding entities, with respect to a first time period;

determining, based on the plurality of values associated with the corresponding entities, whether the plurality of values satisfy a threshold value with respect to a second time period; and in response to the plurality of values satisfying the threshold value, deriving a first characteristic.

18. The non-transitory, computer-readable media of claim 15, wherein the one or more alternative actions part of the synthetic training data correspond to the one or more derived characteristics of the labeled user-specific information, and wherein the instructions that, when executed by the one or more processors, cause operations further comprising:

performing web scraping, based on the one or more derived characteristics, to determine a plurality of values associated with a set of entities, wherein the plurality of values indicate a respective amount associated with an item;

determining, based on the plurality of values associated with the set of entities, whether a first value of the plurality of values satisfies a threshold value, wherein the threshold value indicates a threshold amount of the item; and in response to the first value satisfying the threshold value, determining an alternative action based on the first value and a respective entity corresponding to the first value.

19. The non-transitory, computer-readable media of claim 15, wherein the one or more alternative actions part of the synthetic training data correspond to the one or more derived characteristics of the labeled user-specific information, and wherein the instructions that, when executed by the one or more processors, cause operations further comprising:

retrieving, from a remote database, a set of predetermined alternative actions corresponding to one or more second characteristics;

determining a match between the one or more derived characteristics and the one or more second characteristics; and in response to determining the match between the one or more derived characteristics and the one or more second characteristics, determining the one or more alternative actions based on the match.

20. The non-transitory, computer-readable media of claim 15, wherein the instructions that, when executed by the one or more processors, cause operations further comprising:

receiving, via the user device associated with the user, a user input corresponding to the third action; and performing a fourth action based on the user input corresponding to the third action.

*     *     *     *     *